(12) United States Patent  
Seshasai

(10) Patent No.: US 8,051,128 B2  
(45) Date of Patent: Nov. 1, 2011

(54) USING FEED USAGE DATA IN AN ACCESS CONTROLLED TEAM PROJECT SITE ENVIRONMENT

(75) Inventor: Satwiksai Seshasai, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/555,287

(22) Filed: Nov. 1, 2006

(65) Prior Publication Data

US 2008/0104226 A1    May 1, 2008

(51) Int. Cl.  
*G06F 15/16* (2006.01)

(52) U.S. Cl. .. 709/204; 709/202; 709/224; 707/999.107

(58) Field of Classification Search .................. 709/204, 709/224  
See application file for complete search history.

(56) References Cited

U.S. PATENT DOCUMENTS

| | | | |
|---|---|---|---|
| 2002/0107905 A1* | 8/2002 | Roe et al. ...................... | 709/202 |
| 2003/0028631 A1* | 2/2003 | Rhodes ......................... | 709/224 |
| 2004/0015562 A1 | 1/2004 | Harper et al. | |
| 2005/0108262 A1 | 5/2005 | Fawcett et al. | |
| 2005/0267973 A1 | 12/2005 | Carlson et al. | |
| 2006/0010095 A1 | 1/2006 | Wolff et al. | |
| 2006/0088145 A1 | 4/2006 | Reed et al. | |
| 2006/0095507 A1 | 5/2006 | Watson | |
| 2007/0100960 A1* | 5/2007 | Eichstaedt et al. ............ | 709/217 |
| 2007/0198701 A1* | 8/2007 | Pindra et al. .................. | 709/224 |
| 2007/0220048 A1* | 9/2007 | Ott .............................. | 707/104.1 |
| 2007/0225047 A1* | 9/2007 | Bakos ........................... | 455/566 |

OTHER PUBLICATIONS

<www.pheedo.com> (last visited Oct. 26, 2006).  
<www.myrsscreator.com> (last visited Oct. 31, 2006).  
<www.rapidfeeds.com/rfmfeatures.php> (last visited Oct. 31, 2006).

* cited by examiner

Primary Examiner — Yves Dalencourt  
(74) Attorney, Agent, or Firm — Cuenot, Forsythe & Kim, LLC

(57) ABSTRACT

Feed usage data can be generated. Entries within an existing server log can be identified. The entries can correspond to user requests for a feed from a selected Website. Feed usage data from the identified entries can be determined. Communication of a message to at least one user according to the stored feed usage data can be initiated.

20 Claims, 2 Drawing Sheets

USING FEED USAGE DATA IN AN ACCESS CONTROLLED TEAM PROJECT SITE ENVIRONMENT

BACKGROUND OF THE INVENTION

A "feed" refers to a data format, or a file, that can be used for serving content and, more particularly, content that is updated frequently. Users are able to subscribe to the feed so that the user does not have to visit the location on the Web to view the information. Rather, the feed is provided to the subscribed user through a feed aggregator, feed reader, or other program executing on the user's computer system which requests and obtains the feed from the feed provider.

Typically, a feed is formatted as an Extensible Markup Language (XML) file. ATOM is one type of feed that is an XML-based file format. Really Simple Syndication or Rich Site Summary (RSS) refers to another family of XML-based Web content distribution, republication, and/or syndication protocols.

Conventional systems attempt to generate feed usage data by dynamically processing user requests for feeds as such requests are received from users. This manner of collecting feed usage data cannot easily be added to existing systems without a significant amount of customization and cost. This type of data collection also can be computationally expensive, requiring significant resources so as not to reduce or slow system performance. Further, the information collected by conventional systems traditionally has been limited in scope, which in turn reduces the usefulness of the information, particularly in terms of adapting Web resources to levels of feed usage.

BRIEF SUMMARY OF THE INVENTION

The present invention is directed to generating feed usage data and controlling one or more functions within a team project site environment according to the feed usage data. One embodiment of the present invention can include a method of generating feed usage data. The method can include identifying entries within an existing server log that correspond to user requests for a feed from a selected Website and determining feed usage data from the identified entries. The method further can include initiating communication of a message to at least one user according to the feed usage data.

Another embodiment of the present invention can include a system comprising a server that identifies entries within an existing server log that correspond to user requests for a feed from a selected Website, determines feed usage data from the identified entries, and initiates communication of a message to at least one user according to the feed usage data.

Yet another embodiment of the present invention can include a machine readable storage being programmed to cause a machine to perform the various steps and/or functions described herein.

DETAILED DESCRIPTION OF THE INVENTION

Figure 1:
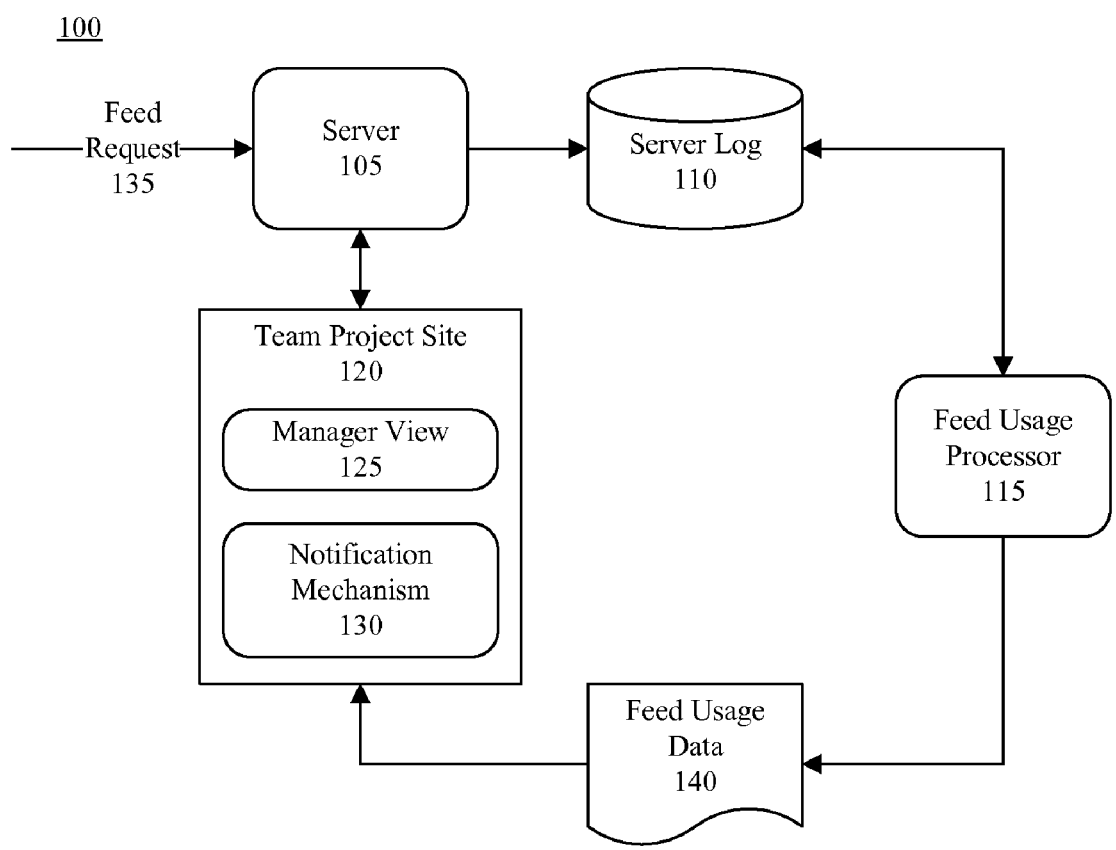
FIG. 1 is a block diagram illustrating a system in accordance with one aspect of the present invention.

As will be appreciated by one skilled in the art, the present invention may be embodied as a method, system, or computer program product. Accordingly, the present invention may take the form of an entirely hardware embodiment or an embodiment combining software, e.g., including firmware, resident software, micro-code, etc., and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain or store the program for use by, or in connection with, the instruction execution system, apparatus, or device.

Any suitable computer-usable or computer-readable medium may be utilized. The medium can be, for example, but is not limited to, an electronic, magnetic, optical, electromagnetic, infrared, or semiconductor system (or apparatus or device). A non-exhaustive list of exemplary computer-readable media can include magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is directed to determining and providing feed usage data for a team project site. Feed usage data can be determined from an analysis of existing server logs which specify requests for feeds from the team project site. Based upon the feed usage data ascertained, various operational parameters of the team project site can be modified or adjusted. For example, various notification mechanisms such as electronic mail (e-mail), instant messaging, etc., can be controlled or adjusted according to the feed usage data. Adjusting functions of the team project site can alleviate redundant information being transmitted within a network and further can reduce the load placed on the systems tasked with sending the redundant information.

FIG. 1 is a block diagram illustrating a system 100 in accordance with one aspect of the present invention. As shown, the system 100 can include a server 105, a server log 110, a feed usage processor 115, and a team project site 120. The server 105 can respond to requests for content, whether such requests are for markup language-based Web pages or for feeds. In one embodiment, the server 105 can be a HyperText Transfer Protocol (HTTP) server that is configured to serve requests for content from the team project site 120 as well as one or more other Websites (not shown).

The server 105 can be communicatively linked with the server log 110 which can be stored or included within a data storage device, whether included within the server 105 or located external to the server 105. The server log 110 can be implemented as an HTTP log and can include entries corresponding to received user requests for content from one or more Websites (sites) including the team project site 120. The plurality of sites for which the server 105 can receive requests can be controlled access Internet Websites, uncontrolled access Internet Websites, intranet sites, whether controlled or uncontrolled, or the like.

Thus, when a request for content, such as a feed request 135, is received from a registered user of the team project site 120, the request can be recorded as an entry within the server log 110. Each entry within the server log 110 can indicate information extracted from the received request as well as information relating to the request. For example, an entry can specify the universal resource identifier (URI), i.e., a universal resource locator (URL) extracted from the request, a time and/or date at which the requested was received by the server 105, hereafter referred to as timestamp information, as well as an identifier that uniquely identifies the user making the request.

It should be appreciated that in the case where the site being accessed is a controlled access site, the users accessing the site will be known and pre-registered. In that case, the identity of the user making the request for content can be determined and recorded in the entry made in the server log 110. In one embodiment, the identity of users of a controlled access site can be specified or determined from the Lightweight Directory Access Protocol (LDAP) distinguished name.

Entries corresponding to requests for content from the team project site 120 can be distinguished from entries corresponding to other sites through an analysis of the URI of the entry in the server log 110. That is, from the URI, the particular site from which content is being requested can be determined. Further, the URI can indicate whether the request is for a feed.

In illustration, a request for content can specify a URL such as "domain/teamplace/Main.nsf/h_Toc/CE6A3D6B/?OpenDocument&Form=h_Rss". As an example, "domain" can be a domain name such as "ibm" followed by the formative "com" and separated by a period. Within the URL, the term "&Form=h_Rss" can indicate that the URL will return an RSS feed. The path information in the URL, which is "teamplace/Main.nsf/h_Toc/folderidentifier/?OpenDocument&Form=h_Rss", can indicate that the content of the feed is drawn from the team project site "teamplace" and is contained with the "Main.nsf" room. Further, the URL can indicate that the content is drawn from the content folder "CE6A3D6B". The content folder can be a unique identifier which can be a system generated folder identifier that is shorter or longer than depicted herein as may be required. As noted, the user also can be determined from the request in the case where the request pertains to a team project or other secured site.

The feed usage processor 115 can process the server log 110 to generate feed usage data 140. The feed usage processor 115 can run from time-to-time or periodically as may be specified by a system administrator or can run upon request from a user or set of users. The feed usage processor 115 can parse the entries of the server log 110 to determine usage statistics relating to one or more sites including the team project site 120. The resulting feed usage data 140 can specify usage information or statistics for feeds from the team project site 120 over a predetermined or specified period of time. The time period represented by the feed usage data 140 can be specified by the administrator as well.

Thus, for a given time period, the feed usage data 140 can specify information including, but not limited to, which entries in the server log 110 correspond to requests for feeds for the team project site 120 as determined by the requested URL, particular folders of the team project site 120 that were accessed and the number of times such folders were accessed, the users that accessed the team project site 120, users that accessed particular folders of the team project site 120, the number of times the team project site was accessed in total over the time period, and the like. It should be appreciated that such information can be provided, or specified, on a per user basis or from a higher level of abstraction, i.e., with respect to the entire team project site 120 including all users or various subsets thereof.

As noted, a feed can refer to information provided as part of a distribution, syndication, and/or republication protocol or infrastructure. Examples of such protocols or feeds can include, but are not limited to, ATOM, Really Simple Syndication or Rich Site Summary (RSS) feeds, other markup language and/or Extensible Markup Language-based protocols, or the like.

The team project site 120 can be a site that is available only to selected users that have been pre-registered to use the site by an administrative entity. In this regard, the team project site 120 is said to be a controlled access site and can be distinguished from non-controlled sites which may require registration and/or passwords, but allow users to register at their own discretion with minimal or no safeguards. The team project site 120 can be available over a public network, such as the Internet, or a private network, such as a WAN or a LAN. As the team project site 120 is available only to a predetermined set of known users, any requests for information, whether for feeds or not, can be associated with a particular user responsible for issuing the request for content.

The team project site 120 can include a manager module 125 and a notification module 130. The manager module 125 can provide selected users of the set of registered users of the team project site 120 with an interface for viewing feed usage data 140. The manager module 125 can provide various views which specify the feed usage data 140 according to user, folder, sets of aggregated usage statistics, or various combinations of each type of feed usage data 140.

The notification module 130 can function as an interface or intermediary to one or more messaging systems (not shown) such as an e-mail system, an instant messaging system, or the like. The notification module 130 can be programmed to cause one or more messaging systems to send messages to selected users according to the feed usage data 140. In illustration, if a particular page of the team project site 120 is updated with new or different content, the notification module 130 can generate an event or instruct an e-mail system to send e-mails to each registered user of the team project site regarding the new or changed content. In another embodiment, the notification module can instruct the e-mail system to send messages to only those registered users that are not subscribed to feeds from the team project site 120 as determined or indicated by the feed usage data 140.

Figure 2:
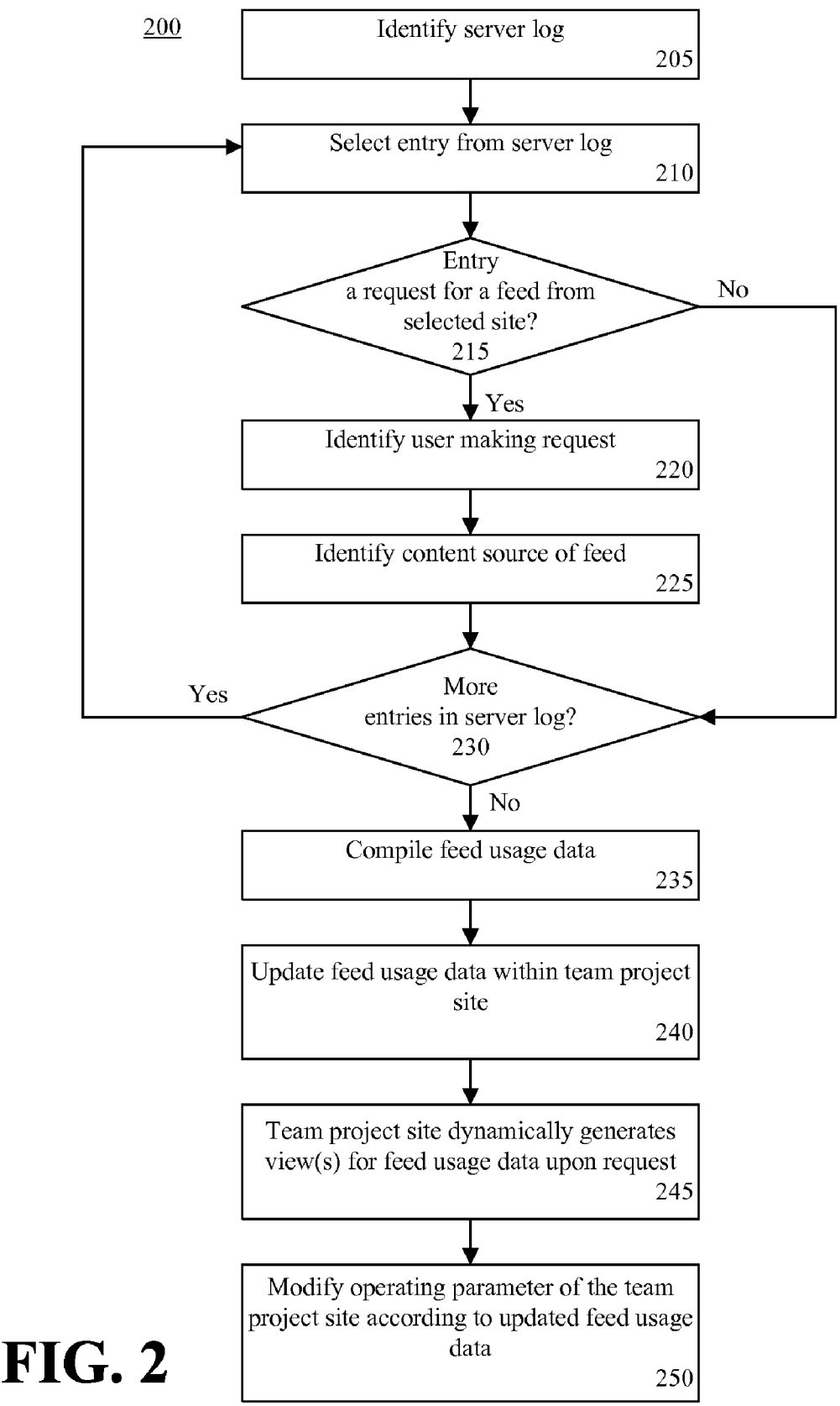
FIG. 2 is a flow chart illustrating another aspect of the present invention.

FIG. 2 is a flow chart illustrating a method 200 in accordance with another aspect of the present invention. The method 200 can be performed by the system described with reference to FIG. 1, for example, by the feed usage processor. The method 200 can begin in a state in which a server log exists and/or is being updated. The method 200 can be performed from time to time, periodically, or responsive to a user request. In one embodiment, for example, an administrator can specify that upon the expiration of a particular time period, the method 200 can be performed. Further, as noted, the administrator can specify a particular time period to be reflected by the feed usage data that will be generated, whether a day, a week, a month, etc.

In step 205, the server log can be identified. As noted, the server log can include an entry for each request for content from the team project site, whether the request is for a feed or for some other form of content available from the team project site. The server log further can include entries for requests for content from one or more other sites that may or may not be controlled access sites.

In step 210, an entry in the server log that corresponds to a received user request for content can be selected. In step 215, a determination can be made as to whether the selected entry specifies a request for a feed from a selected site, such as the team project site. If so, the method can continue to step 220. If not, the method can proceed to step 230. As noted, the information needed for determining whether the request is for a feed from a selected site can be determined from a review of the URL specified in the request and, thus, recorded as part of the entry in the server log.

In step 220, in the case where the selected entry is determined to be a request for a feed from the selected site, the user making the request can be identified. In step 225, the particular content source, for example a folder that identifies a logical and/or physical location in a network, from which content for the feed is being provided can be identified. In step 230, a determination can be made as to whether more entries remain in the server log to be processed. If so, the method can loop back to step 210 to continue processing as may be required. If not, the method can continue to step 235.

In step 235, the feed usage processor can compile feed usage data from the entries identified and the data determined from the entries as described with reference to steps 215-225. Examples of the various metrics or type of information that can be compiled by the feed usage processor can include but is not limited to, the users subscribed to a particular feed, the users that accessed a particular folder, the number of times a selected feed was accessed, the number of times a selected folder was accessed in relation to a feed, and the number of times a particular user accessed a particular feed and/or folder. As noted, such information can be aggregated to provide usage information on a higher level, i.e., with respect to the selected site in terms of total users accessing the feed, folder, or site as the case may be, or can be provided on a per-user or per-user group level.

In step 240, the feed usage data within the team project site can be updated according to the feed usage data compiled in step 235. One or more items of feed usage data or all of the feed usage data can be stored within a data structure that is included within, or accessible by, the team project site. In step 245, the team project site can generate one or more views of the updated feed usage data upon request from a user, such as a manager or other administrator. The different views of the data can present the feed usage data categorized or filtered by user, folder, or presented aggregated form, i.e., for an entire server, which can include feed usage data for a plurality of sites.

In step 250, an operating parameter of the team project site can be modified according to the updated feed usage data. Modifying one or more operational parameters of the team project site allows one or more functions to be controlled and/or dynamically changed according to the updated feed usage data. In one aspect, the modification of an operational parameter can be performed manually, for example, by a system administrator or manager, based upon a review of the feed usage data. In another aspect, such modifications can be performed automatically according to one or more established rules.

For example, the notification module can be programmed to obtain the updated feed usage data of the team project site and identify those users that are subscribed to feeds for the team project (or selected) site. The identified users can be removed from an e-mail notification list. Accordingly, users that obtain information via one or more feeds for a given site will not receive redundant information via e-mail. Put another way, the users of the team project site that are not subscribed to a feed for the site will receive e-mail notifications. This can reduce the load placed upon e-mail and other messaging systems.

In another example, some implementations of Web-based team project sites which provide feeds include an image in the view of all documents in the folder. This image is associated or linked to the feed for the folder. In one embodiment, the determination of whether the image is shown can be made dynamically from the feed usage data. For example, a script, such as a Javascript, can be used to query whether to show the image for a particular folder. The feed usage data can specify a threshold that indicates whether the image should be shown.

In one embodiment, a threshold involving a percentage of users and a grace period after the folder is created can be set. For example, if the server administrator sets the grace period to two weeks and the percentage to 10%, if a given folder was created more than two weeks prior, and less than 10% of the users are subscribed to the feed from the folder, the feed image is not displayed. This can be useful when the team project site is used in situations where the feed image would be distracting or inappropriate to display based on the type of content stored in the folder.

While the method 200 has been described with reference to a single team project site, it should be appreciated that the method can be applied to compile and generate feed usage data for a plurality of sites rather than for a particular, or selected, site. In that case, additional parsing and/or processing steps can be included to identify the particular site being accessed or referenced by an entry within the server log such that the feed requests for multiple sites can be tracked.

The embodiments disclosed are directed to generating feed usage data from existing server logs. Once obtained, the data can be filtered and/or processed. The resulting feed usage data can be used to update information within a selected site and further modify and/or change various operational parameters of the site according to the updated feed usage data.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of generating feed usage data comprising:
    via a processor, identifying entries within an existing server log that correspond to user requests for a feed from a selected Website;
    via the processor, determining feed usage data from the identified entries, wherein the feed usage data specifies usage statistics for feeds from the Website over a period of time;
    via the processor, identifying users that are subscribed to the feed;
    via the processor, removing from a notification list each of those users that are subscribed to the feed; and
    via the processor, initiating communication of a message, according to the feed usage data, exclusively to users that are not subscribed to the feed and that remain on the notification list.

2. The method of claim 1, wherein initiating communication of the message to the at least one user comprises initiating communication of an e-mail to the at least one user.

3. The method of claim 1, wherein the message provides a notification of a content change on the selected Website.

4. The method of claim 1, wherein determining feed usage data comprises identifying a user identity for each entry of the server log that specifies a request for a feed.

5. The method of claim 4, wherein determining feed usage data further comprises determining a number of requests, by at least one user, for a feed from the selected Website.

6. The method of claim 1, wherein determining feed usage data further comprises identifying a folder of the selected Website from each entry of the server log that is identified as corresponding to a user request for a feed from the selected Website.

7. The method of claim 6, wherein determining feed usage data further comprises determining a number of times a particular folder was accessed.

8. The method of claim 6, wherein determining feed usage data further comprises:
    identifying a user identity for each entry of the server log that specifies a request for a feed; and
    determining a number of times a particular folder was accessed by a selected user.

9. The method of claim 1, further comprising presenting feed usage data responsive to a user request.

10. A system that generates feed usage data, the system comprising:
    a server that:
        identifies entries within an existing server log that correspond to user requests for a feed from a selected Website;

determines feed usage data from the identified entries, wherein the feed usage data specifies usage statistics for feeds from the Website over a period of time;

identifies users that are subscribed to the feed;

removes from a notification list each of those users that are subscribed to the feed; and initiates communication of a message, according to the feed usage data, exclusively to users that are not subscribed to the feed and that remain on the notification list.

11. The system of claim 10, wherein the server initiates communication of the message to the at least one user by initiating communication of an e-mail to the at least one user.

12. The system of claim 10, wherein the message provides a notification of a content change on the selected Website.

13. The system of claim 10, wherein the server identifies a user identity for each entry of the server log that specifies a request for a feed.

14. A computer program product comprising:

a non-transitory computer readable storage medium having stored thereon computer readable program code that, when executed by a system comprising a processor and a memory, generates feed usage data, the computer readable storage medium comprising:

computer usable program code that identifies entries within an existing server log that correspond to user requests for a feed from a selected Website;

computer usable program code that determines feed usage data from the identified entries, wherein the feed usage data specifies usage statistics for feeds from the Website over a period of time;

computer usable program code that identifies users that are subscribed to the feed;

computer usable program code that removes from a notification list each of those users that are subscribed to the feed; and computer usable program code that initiates communication of a message, according to the feed usage data, exclusively to users that are not subscribed to the feed and that remain on the notification list.

15. The computer program product of claim 14, wherein the computer usable program code that initiates communication of the message to the at least one user initiates communication of an e-mail to the at least one user.

16. The computer program product of claim 14, wherein the message provides a notification of a content change on the selected Website.

17. The computer program product of claim 14, wherein the computer usable program code that determines feed usage data comprises computer usable program code that identifies a user identity for each entry of the server log that specifies a request for a feed.

18. The computer program product of claim 14, wherein the computer usable program code that determines feed usage data further comprises computer usable program code that determines a number of requests, by at least one user, for a feed from the selected Website.

19. The computer program product of claim 14, wherein the computer usable program code that determines feed usage data further comprises computer usable program code that identifies a folder of the selected Website from each entry of the server log that is identified as corresponding to a user request for a feed from the selected Website.

20. The computer program product of claim 14, wherein the computer usable program code that determines a number of times a particular folder was accessed.

\* \* \* \* \*